(12) United States Patent
Kaliaguine et al.

(10) Patent No.: US 6,770,256 B1
(45) Date of Patent: Aug. 3, 2004

(54) PROCESS FOR SYNTHESIZING METAL OXIDES AND METAL OXIDES HAVING A PEROVSKITE OR PEROVSKITE-LIKE CRYSTAL STRUCTURE

(75) Inventors: Serge Kaliaguine, Lac Saint-Charles (CA); André Van Neste, Sainte-Foy (CA)

(73) Assignee: Universite Laval, Quebec (CA)

( * ) Notice: Subject to any disclaimer, the term of this patent is extended or adjusted under 35 U.S.C. 154(b) by 0 days.

(21) Appl. No.: 09/743,985

(22) PCT Filed: Jul. 15, 1999

(86) PCT No.: PCT/CA99/00638

§ 371 (c)(1),
(2), (4) Date: Apr. 9, 2001

(87) PCT Pub. No.: WO00/03947

PCT Pub. Date: Jan. 27, 2000

Related U.S. Application Data

(63) Continuation-in-part of application No. 09/116,732, filed on Jul. 16, 1998, now Pat. No. 6,017,504.

(51) Int. Cl.$^7$ .......................... C01F 17/00; C01F 11/00; C01G 49/00; C01G 51/00; C01G 53/00

(52) U.S. Cl. ................... 423/593.1; 423/253; 423/263; 423/594.1; 423/594.2; 423/594.3; 423/594.4; 423/594.5; 423/594.6; 423/594.7; 423/594.8; 423/594.9; 423/594.12; 423/594.13; 423/594.15; 423/594.16

(58) Field of Search ........................ 423/594.9, 594.12, 423/594.13, 594.15, 594.16, 263, 593, 594, 595, 596, 598, 599, 600, 253, 593.1, 594.1, 594.2, 594.3, 594.4, 594.5, 594.6, 594.7, 594.8; 502/525

(56) References Cited

U.S. PATENT DOCUMENTS

| | | | |
|---|---|---|---|
| 4,055,513 A | 10/1977 | Wheelock | ................... 252/462 |
| 4,065,544 A | 12/1977 | Hamling et al. | ............ 423/252 |
| 4,134,852 A | 1/1979 | Volin | .......................... 252/472 |
| 4,151,123 A | 4/1979 | McCann, III | ............... 252/462 |
| 4,738,946 A | 4/1988 | Yamashita et al. | .......... 502/303 |
| 5,093,301 A | 3/1992 | Chu et al. | ................... 502/303 |
| 5,380,692 A | 1/1995 | Nakatsuji et al. | .......... 502/303 |
| 5,900,223 A | 5/1999 | Matijevic et al. | ........... 423/263 |
| 6,017,504 A | * 1/2000 | Kaliaguine et al. | |

FOREIGN PATENT DOCUMENTS

EP 0669296 8/1995

OTHER PUBLICATIONS

Kosova, et al., "Mechanochemical Synthesis of Dicalcium Ferrite . . . " Inorganic Materials, vol. 34, No. 4, 1998, no month, pp. 385–390.*

Baek, et al., "Mechanisms of multi–component perovskite . . . " Materials Science Forum, 1997, no month, 235–238.(Pt. 1, Synthesis and Properties of Mechanically Alloyed and Nanocrystalline Materials, 115–119.*
Wan, et al., "Synthesis of single phase . . . " Acta Materialia, May 28, 1999, 47(7), 2283–91.*
Xue, et al., "Mechanochemical synthesis of nanosized lead titanate powders" Materials Letters, Jun., 1999, 39(6), 364–69.*
Wang, et al., "Mechanochemically synthesized lead magnesium niobate" J. Amer. Ceramic Soc. May 1999, 82(5), 1358–60.*
Wang, et al., "Synthesizing nanocrystalline . . . " J. Amer. Ceramic Soc. Feb., 1999, 82(2), 477–79.*
Wang, et al., "Mechanochemical synthesis of . . . mixed oxides" Advanced Materials, Mar. 1999, 11(3), 210–13.*
La Revue de Métallurgie–CIT/Sciences et Genles Des Matériaux,–Feb., 1993, D. Michel et al., Oxdes Céramiques Elaborés Par Voie Mecanochimique.
Journal of the American Ceramic Society, 1993, vol. 76, pp. 2884–288, D. Michel et al., Stabilized Zirconias Prepared by Mechanical Alloying, no month.
J. Mater. Res., vol. 8, pp. 2985–2992, Nov. 1993, P.A. Zielinski et al., Structural Transmformations of Alumina by High Energy Ball Milling, Nov.
Materials Transactions, JIM, vol. 36, No. 2, Feb. 1995, E. Gaffet et al., Formation of Nanostructural Materials Induced by Mechanical Processings (Overview).
Chemical abstracts No. 163896, vol. 127, No. 12, pp. 1064–1068 (Xiong, Gang et al.; and, J. Mater. Sci. Lett) (1997), no month.
Chemical abstracts No. 62462, vol. 125, No. 6 (Nozaki, Katsutoshi et al, and, JP 08 091846 A) (1996), Apr.
Database WPI: Derwent Publications Ltd; and, JP 51 000394 A (1976), Jan.
Chemical abstracts No. 25412, vol 74, No. 6 (Rubiner, I.A. et al.; and, Zavod. Lab.) (1970), no month.

(List continued on next page.)

*Primary Examiner*—Steven Bos
(74) *Attorney, Agent, or Firm*—Darby & Darby (57) ABSTRACT

Metal oxides having a perovskite or perovskite-like crystal structure are prepared by a process comprising subjecting a mixture of starring powders to a high energy milling sufficient to induce chemical reaction of the components and thereby directly mechanosynthesize said metal oxide in the form of a perovskite or a perovskite-like material having a nanocrystalline structure as determined by X-ray diffractometry. The process according to the present invention is simple, efficient, not expensive and does not require any heating step for producing a perovskite that may easily show a very high specific surface area. Another advantage is that the perovskite obtained according to the present invention also has a high density of lattice defects thereby showing a higher catalytic activity, a characteristic which is highly desirable in their eventual application as catalysts and electronic conductors.

10 Claims, 4 Drawing Sheets

OTHER PUBLICATIONS

Chemical abstracts No. 31983, vol. 91, No. 4 (Nedil' Ko, S.A. et al.; and, Zh. Neorg. Khim) (1979), no month.

Matteazzi P et al., vol. 2, No. 3, pp. 217–229 (Nanostructured Materials) (1993), no month.

E. Gaffet et al, vol. 37, pp. 198–209 (Materials Transactions JIM) (1995), no month.

Kocoba, H.B. et al., *NAYKA* (Siberian Chemical Magazine), Issue 3, pp. 121 and 122, with English translation of second paragraph, p. 122, no date.

* cited by examiner

PROCESS FOR SYNTHESIZING METAL OXIDES AND METAL OXIDES HAVING A PEROVSKITE OR PEROVSKITE-LIKE CRYSTAL STRUCTURE

The present application is a national stage under 35 U.S.C. § 371 of PCT/CA99/00638, filed Jul. 15, 1999, which is a continuation-in-part of U.S. patent application Ser. No. 09/116,732, filed on Jul. 16, 1998 now issued U.S. Pat. No. 6,017,504.

FIELD OF THE INVENTION

The present invention relates to a process for synthesizing a metal oxide having a perovskite or perovskite-like crystal structure by high energy milling. More particularly, a mixture of starting powders are subjected to a high energy milling sufficient to induce chemical reaction of the components and thereby directly mechanosynthesize a metal oxide in the form of a perovskite or perovskite-like nanocrystalline structure as determined by X-ray diffractometry.

BACKGROUND OF THE INVENTION

In general, mixed metal oxides are crystalline compounds and they are classified by general formulas and certain structural-type characteristics of naturally occurring minerals. Perovskite is a well-known type of mixed metal oxides. Perovskites have the general formula $ABO_3$ where A and B stand for cations. More than one cation for each A and B may be present.

Another type of metal oxide includes "perovskite-like" materials which comprises basic perovskite cell separated by intervening oxide layers. Perovskite-like materials have the general formula $[(ABO_3)_n + C_yO_z]$ where A, B and C stand for cations. More than one cation for each A, B and C may be present.

Are also known compounds derived from perovskite or perovskite-like materials by substitution and deviations to stoichiometry but maintaining their perovskite or perovskite-like crystal structure. Non-stoichiometric compounds derived from perovskites have the general formula $(ABO_{3-x})$ and non-stoichiometric compounds derived from perovskite-like materials have the general formula $[(ABO_{3-x})_n + C_yO_z]$. In all these non-stoichiometric compounds, metal ions with a different valence may replace both A and B ions thereby generating non-integral numbers of oxygen atoms in the formula. $La_{0.8}Sr_{0.2}CoO_{3-x}$ and $La_{0.8}Sr_{0.2}MnO_{3-x}$ are examples of non-stoichiometric compounds derived from perovskites and $Sr_2FeO_{4-x}$ and $Sr_3Fe_2O_{7-x}$ are examples of non-stoichiometric compounds derived from perovskite-like materials. Other examples of such deviation to stoichiometry are obtained by making a perovskite or a perovskite-like material deficient in oxygen. For example, the brownmillerite structure ($ABO_{2.5}$) is formed from perovskites ($ABO_3$).

It is at once apparent that there is quite a large number of compounds which fall within the scope of the term perovskite and perovskite-like materials. The compounds and their structure can be identified by X-ray diffraction.

In prior art, perovskite and perovskite-like compounds have been commonly used in the following fields: electrocatalysis, hydrogenation, dehydrogenation and autoexhaust purification. One drawback with the metal oxides having the perovskite and perovskite-like structure produced in prior art is that, in general, they show a very low BET specific surface area (SS) in the order of 1 $m^2/g$. Therefore despite the fact that perovskite and perovskite-like structure metal oxides are not expensive to produce, that they usually show good catalytic oxidation activities, that they are thermally stable and that they show a good resistance to poisoning, they have found to date very limited application in place of noble metal based catalysts used in the field of industrial pollution abatement or automobile emission control. Higher specific surface area perovskite and perovskite-like compounds could thus have a great potential as catalysts, particularly in the selective reduction of nitrogen oxides ($NO_x$) and as electrocatalysts in the cathodic reduction of oxygen.

The known methods for preparing perovskites and perovskite-like materials include sol-gel process, co-precipitation, citrate complexation, pyrolysis, spray-drying and freeze-drying. In these, precursors are prepared by a humid way such as in a mixed gel or in the co-precipitation of metallic ions under the form of hydroxides, cyanides, oxalates, carbonates or citrates. These precursors can thus be submitted to various treatments such as evaporation or combustion (SS~1–4 $m^2/g$), to the method of explosion (SS<30 $m^2/g$), plasma spray-drying (SS~10–20 $m^2/g$) and freeze-drying (SS~10–20 $m^2/g$). However, the drawbacks with all of these methods are that either low specific surface area values are reached or that they are complicated and expensive to put into practice.

The most common method for preparing perovskite and perovskite-like catalysts is the traditional method called "ceramic". This method simply consists in mixing constituent powders (oxides, hydroxides or carbonates) and sintering the powder mixture thus formed to high temperature. The problem with this method is that calcination at high temperature (generally above 1000° C.) is necessary to obtain the crystalline perovskite or perovskite-like crystalline structure. Another drawback lo is that low specific surface area value is obtained (SS around 1 $m^2/g$). An example of such a high temperature heating method is disclosed in U.S. Pat. No. 5,093,301 where a perovskite structure to be used in a catalyst is formed after heating a ground dry powder mixture at 1300° C.

U.S. Pat. No. 4,134,852 (Volin et al.) issued in 1979 disclosed a variant to the ceramic method by "mechanically alloying", in the old sense of that expression, the constituent powders necessary for the preparation of perovskite catalysts. Indeed, it refers to a conventional grinding in order to obtain a more or less homogenous mixture of particles but not infer any chemical reaction between the components. It can be read in column 7, lines 5–8 of this patent that "[a] mechanically alloyed powder is one in which precursor components have been intimately intradispersed throughout each particle . . . ". Therefore a necessary step of the process disclosed therein to obtain the desired perovskite structure is by heating the "mechanically alloyed" powder composition to an elevated temperature greater than 800° C. (column 7, lines 61–62).

Today, the use of the expression "mechanical alloying" or "mechanosynthesis" refers among other things to a high energy milling process wherein nanostructural particles of the compounds milled are induced. Therefore it also refers to the production of metastable phases, for example high temperature, high pressure or amorphous phases, from crystalline phases stable under ambient temperature and pressure. For example, the structural transformation of alumina ($Al_2O_3$), the preparation of ceramic oxides and the preparation of stabilized zirconias by high energy milling or mechanical alloying have already been respectively disclosed in the following references: P. A. Zielinski et al. in J. Mater. Res., 1993, Vol. 8. p 2985–2992; D. Michel et al., La revue de métallurgie-CIT/Sciences et Génies des matériaux, February 1993; and D. Michel et al., J. Am. Ceram. Soc., 1993, Vol 76, p 2884–2888. The publication by E. Gaffet et al. in Mat. Trans., JIM, 1995, Vol 36, (1995) p 198–209) gives an overview of the subject.

However, even if these papers disclosed the use of high energy milling, their authors have only been able to transform their starting product from one phase to another phase. The product resulting from the milling thus still has the same structure. Furthermore, none of them discloses the preparation of perovskite or perovskite-like materials.

There is still presently a need for a simple process, low in cost for producing a metal oxide having the perovskite or the perovskite-like crystal structure. Furthermore, the perovskite and perovskite-like metal oxides produced according to all of the above mentioned methods known in the art does not have a nanocrystalline structure. Therefore, there is also a need for a metal oxide having a perovskite or a perovskite-like nanocrystalline structure with a high specific surface area and need for a process for synthesizing such compounds.

SUMMARY OF THE INVENTION

An object of the present invention is to propose a process for producing a metal oxide that will satisfy the above-mentioned needs.

According to the present invention, that object is achieved with a process for mechanosynthesizing a metal oxide having a perovskite or perovskite-like crystal structure and a predetermined stoichiometric content of oxygen, said metal oxide being selected from the group consisting of perovskites of the general formula $ABO_3$; perovskite-like materials of the general formula $[(ABO_3)_n+C_yO_z]$; non-stoichiometric compounds derived from perovskites and having the general formula $(ABO_{3-x})$; and non-stoichiometric compounds derived from perovskite-like materials and having the general formula $[(ABO_{3-x})_n+C_yO_z]$, wherein:

A comprises at least one element selected from the group consisting of Al, Y, Na, K, Rb, Cs, Pb, La, Sr, Ba, Cr, Ag, Ca, Pr, Nd, Bi and the elements of the lanthanide series of the periodic table;

B comprises at least one element selected from the group consisting of Al, Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo and W;

C represents at least one element selected from the group consisting of Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo, W, Al, Y, Na, K, Rb, Cs, Pb, La, Sr, Ba, Cr, Ag, Ca, Pr, Nd, Bi and the elements of the lanthanide series of the periodic table;

n represents an integer number between 1 and 10;

$0<x<3$ y represents an integer number between 1 and 5;

z represents an integer number between 1 and 5;

the process comprising the step of subjecting a mixture of starting powders formulated to contain the components represented by A, B and C in the formulas to a high energy milling sufficient to induce chemical reaction of the components and thereby directly mechanosynthesize said metal oxide in the form of a perovskite or a perovskite-like material having a nanocrystalline structure as determined by X-ray diffractometry.

According to a preferred variant of the invention, the high energy milling is performed under a controlled atmosphere to control the nanocrystalline structure and the stoichiometric oxygen content of the mechanosynthesized metal oxide. The controlled atmosphere preferably comprises a gas selected from the group consisting of He, Ar, $N_2$, $O_2$, $H_2$, CO, $CO_2$, $NO_2$, $NH_3$, $H_2S$ and mixtures thereof.

In another preferred variant of the invention, the process is characterized in that it further comprises the step of selecting and milling the starting powders in relative portions to control the nanocrystalline structure of the mechanosynthesized metal oxide.

The present invention also provides a process for mechanosynthesizing a metal oxide having a perovskite or perovskite-like crystal structure, a predetermined stoichiometric content of oxygen, and a high BET specific surface area, said metal oxide being selected from the group consisting of perovskites of the general formula $ABO_3$; perovskite-like materials of the general formula $[(ABO_3)_n+C_yO_z]$; non-stoichiometric compounds derived from perovskites and having the general formula $(ABO_{3-x})$; and non-stoichiometric compounds derived from perovskite-like materials and having the general formula $[(ABO_{3-x})_n+C_yO_z]$, wherein:

A comprises at least one element selected from the group consisting of Al, Y, Na, K, Rb, Cs, Pb, La, Sr, Ba, Cr, Ag, Ca, Pr, Nd, Bi and the elements of the lanthanide series of the periodic table;

B comprises at least one element selected from the group consisting of Al, Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo and W;

C represents at least one element selected from the group consisting of Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo, W, Al, Y, Na, K, Cs, Pb, La, Sr, Ba, Cr, Rb, Ag, Ca, Pr, Nd, Bi and the elements of the lanthanide series of the periodic table;

n represents an integer number between 1 and 10;

$0<x<3$ y represents an integer number between 1 and 5;

z represents an integer number between 1 and 5;

the process comprising the steps of:

a) subjecting a mixture of starting powders formulated to contain the components represented by A, B and C in the formulas to a high energy milling sufficient to induce chemical reaction of the components and thereby directly mechanosynthesize said metal oxide in the form of a perovskite or a perovskite-like material having a nanocrystalline structure as determined by X-ray diffractometry;

b) increasing the BET specific surface area of the metal oxide obtained in step a) by further subjecting said metal oxide to high energy milling to obtain a metal oxide having a high BET specific surface area.

Step a) is preferably performed under a controlled atmosphere to control the nanocrystalline structure and the stoichiometric oxygen content of the mechanosynthesized metal oxide. Step b) is preferably performed under a controlled atmosphere to control the BET specific surface area of the mechanosynthesized metal oxide. The controlled atmospheres preferably comprise a gas selected from the group consisting of $H_2O$, He, Ar, $N_2$, $O_2$, $H_2$, CO, $CO_2$, $NO_2$, $NH_3$, $H_2S$ and mixtures thereof.

The process for mechanosynthesizing a metal oxide having a perovskite or perovskite-like crystal structure, a predetermined stoichiometric content of oxygen, and a high BET specific surface area according to the invention may further comprises one or more additional steps. In another preferred embodiment, the process further comprises the step of adding a small amount of an aqueous solution to the metal oxide during the milling of step b) in order to obtain a humidified metal oxide. In another preferred embodiment, the process further comprises the step of selecting and milling the starting powders in relative portions to control the final nanocrystalline structure of the mechanosynthesized metal oxide. In an additional preferred embodiment, the process further comprises the steps of c): adding a non-reacting soluble additive during the milling of step b); and d): subsequently washing out said soluble additive. Preferably, the non-reacting soluble additive is selected from the group consisting of LiCl, NaCl, RbCl, CsCl, $NH_4Cl$, ZnO, and $NaNO_3$.

It is also an object of the invention to provide a metal oxide having a perovskite or a perovskite-like nanocrystalline structure and having a BET specific surface area between 3.1 and 82.5 $m^2/g$, this metal oxide being obtained using any one of the above mentioned processes. Preferably, the metal oxide is characterized in that it consists of a brownmillerite having the formula $ABO_{2.5}$ or $[(ABO_{2.5})_n + C_yO_z]$ and more particularly a brownmillerite selected from the group consisting of $Sr_7Fe_{10}O_{22}$, $SrFeO_{2.5}$ and $SrFe_{0.5}Co_{0.5}O_{2.5}$.

As can be appreciated, the processes according to the present invention are simple, efficient, not expensive and do not require any heating step for producing a metal oxide having a perovskite or a perovskite-like nanocrystalline structure that may easily show a very high specific surface area. Another advantage is that the perovskite or perovskite-like obtained according to the present invention also have a nanocrystalline structure and a high density of lattice defects thereby showing a higher catalytic activity, a characteristic which is highly desirable in their eventual application as catalysts and electronic conductors. The fact that it is possible to synthesize brownmillerites using the processes of the invention is also a major advantage of the present invention.

A non-restrictive description of preferred embodiments of the present invention will now be given with reference to the appended drawings and tables.

DESCRIPTION OF PREFERRED EMBODIMENTS

The present invention relates to a new process called "mechanical alloying" or "mechanosynthesis" for producing metal oxides having a perovskite or a perovskite-like nanocrystalline structure simply by subjecting to high energy milling a mixture of starting powders, this high energy milling being sufficient to induce chemical reaction of the components and thereby directly mechanosynthesize a metal oxide in the form of a perovskite or perovskite-like nanocrystalline structure as determined by X-ray diffractometry.

As indicated throughout, the term "high energy milling" refers to the condition which is developed in the container of a "high energy mill" and where nanostructural particles of the components in the mill are induced. Examples of such high energy is mill include: planetary milling machine (so called G5 and G7), PULVERISETTE™ (P5 and P7) milling planetary machine, ASI UNI-BALL MILL II™ and SPEX™ horizontal mill.

During the milling, the balls are projected violently way and back within the container of the mill. The balls also bang each other within the container. When sufficient mechanical energy is applied to the total charge (balls and powders), it is believed that a substantial portion of the charge is continuously and kinetically maintained in a state of relative motion. To achieve the "mechanosynthesis", the impact energy developed by these repetitive shocks must be sufficient to induce nanostructural particles of the components in the order of 10 to 100 nanometers in order to generate physicochemical reactions only through mechanical forces.

To illustrate the invention and to give those skilled in the art a better understanding of the invention, the results obtained for the preparation of various perovskites and perovskite-like materials are given below.

In a first preferred embodiment, the mechanosynthesized perovskite is $LaCoO_3$. Thus for this example, La stands for A and Co stands for B in the empirical formula $ABO_3$. However a person skilled in the art will understand that the range of application of the current process is much larger since A comprises at least one element selected from the group consisting of Al, Y, Na, K, Rb, Cs, Pb, La, Sr, Ba, Cr, Ag, Ca, Pr, Nd, Bi and the elements of the lanthanide series of the periodic table; and B comprises at least one element selected from the group consisting of Al, Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo and W. As it will be explained in greater details herein after, $CeCuO_3$, $LaAlO_3$, $LaMnO_3$, $LaInO_3$, $YCoO_3$ and $SrFeO_3$ have also been mechanosynthesized using the process of the present invention.

According to the process of the invention, perovskites of the formula $A_{1-a}A'_aB_{1-b}B'_bO_3$, where A and A' are of the same or of different valence and B the same or different valence as B', can also be prepared. Multiple oxides (triple, quadruple, etc. . . . ) such as $La_aSr_{1-a}CoO_3$, $La_aSr_{1-a}Co_bFe_{1-b}O_3$ and $La_{a1}Sr_{a2}Ba_{1-a1-a2}Co_{b1}Fe_{b2}Ni_{1-b1-b2}O_3$ can also be produced just by selecting and mixing the starting powders according to the stoichiometric proportion constituting the desired perovskite. Among these potential products, the ones having the most important commercial values are $LaCoO_3$, $La_{0.8}Sr_{0.2}Co_{0.85}Fe_{0.15}O_3$, and $NdMnO_3$. Enclosed herein are examples of the mechanosynthesis of $La_{0.6}Sr_{0.4}Co_{0.8}Fe_{0.2}O_3$, $La_{0.6}Sr_{0.4}CoO_3$, $La_{0.6}Sr_{0.4}MnO_3$ and $LaMn_{0.8}Mg_{0.2}O_3$.

In another preferred embodiment, the metal oxide mechanosynthesized are "perovskite-like" materials which comprises basic perovskite cell separated by intervening oxide layers. Perovskite-like materials have the general formula $[(ABO_3)_n + C_yO_z]$ where A stands for a cation selected from the group consisting of Al, Y, Na, K, Rb, Cs, Pb, La, Sr, Ba, Cr, Ag, Ca, Pr, Nd, Bi and the elements of the lanthanide series of the periodic table; B stands for a cation selected from the group consisting of Al, Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo and W; and C stands for a cation selected from the group consisting the cations of groups A and B combined. More than one cation for each A, B and C may be present. Enclosed herein is an example of the mechanosynthesis of [$SrFe_{0.5}Co_{0.5}O_3+Fe_{0.5}O_{x*}$] or $SrFeCo_{0.5}O_{3+x*}$ wherein $0<x*<10$.

In a further preferred embodiment of the invention, the metal oxide mechanosynthesized are non-stoichiometric compounds derived from perovskite or perovskite-like materials. These non-stoichiometric compounds are characterized in that even though they maintain the crystal structure of perovskite or perovskite-like materials, their oxygen content in the perovskite part deviates from the regular $ABO_3$ stoichiometric content. Non-stoichiometric compounds derived from perovskites have the general formula ($ABO_{3-x}$) and non-stoichiometric compounds derived from perovskite-like materials have the general formula [$(ABO_{3-x})_n+C_yO_z$]. In all these non-stoichiometric compounds, metal ions with a different valence may replace both A and B ions thereby generating non-integral numbers of oxygen in the formula. $La_{0.8}Sr_{0.2}CoO_{3-x}$ and $La_{0.8}Sr_{0.2}MnO_{3-x}$ are examples of non-stoichiometric compounds derived from perovskites and $Sr_2FeO_{4-x}$ and $Sr_3Fe_2O_{7-x}$ are examples of non-stoichiometric compounds derived from perovskite-like materials. Others examples of such deviations to stoichiometry are obtained by making a perovskite or a perovskite-like material deficient in oxygen. For example, the brownmillerite structure ($ABO_{2.5}$) is formed from perovskites ($ABO_3$). Enclosed herein are examples of the mechanosynthesis of $SrFeO_{2.5}$, [$SrFeO_{2.5}+Fe_{0.5}O_{0.5+x}$] or $SrFe_{1.5}O_{3+x}$ and [$(SrFeO_{2.5})_7+Fe_3O_{4.5}$] or $Sr_7Fe_{10}O_{22}$.

To form the perovskite or perovskite-like crystal structure, the starting materials are selected on a basis of availability and cost provided that the form is suitable (i.e. fine powder) and unwanted additives are not introduced into the product. By selecting and milling the starting powders in specific relative portions it is also possible to control the nanocrystalline structure of the mechanosynthesized metal oxide.

In the preferred embodiments of the invention, lanthanum has been introduced as the elementary oxide $La_2O_3$, strontium as the elementary oxide $SrO$, cobalt as the elementary oxide $CO_3O_4$ and iron as the elementary oxide $Fe_2O_3$. Compounds such as hydroxides, carbonates, nitrates, oxalates, chlorides could also be used.

High energy milling may be operated under controlled atmosphere, whether oxidizing, neutral or reducing and under pressure or partial vacuum. Suitable atmospheres comprise a gas selected from the group consisting of $H_2O$, He, Ar, $N_2$, $O_2$, $H_2$, CO, $CO_2$, $NO_2$, $NH_3$, $H_2S$ and mixtures thereof. Temperature may also be controlled to some extent. By the appropriate choice of the starting materials and their quantities, oxides or suboxides and the grinding conditions, mainly the atmosphere and its oxygen partial pressure, it is possible to obtain for the same metallic elements, the oxygen-rich cubic phase or ideal perovskite or the oxygen deficient orthorhombic phase, the brownmillerite phase. This is the case for the strontium-cobalt-iron system. As an example, it is possible to obtain $SrCoO_3$ and $SrFeO_3$ which are cubic perovskites or $SrCoO_{2.5}$ and $SrFeO_{2.5}$ which are orthorhombic, the structure of the brownmillerite. The orthorhombic structure, with other structures like the rhombohedric structure are generally called "perovskite-type" or "perovskite-like" structures and may be interpreted to some extent like a deformation of the ideal cubic perovskite. Doping by other metallic elements as well as control of the resulting stoichiometry and defect concentration (vacancies) are easily controlled by the relative quantities of the starting materials and by the amount of oxygen introduced into the mill container.

Alternatively or simultaneously with the introduction of a reactive gas in the atmosphere of the high energy mill, it is possible to add an additive during step b) of the process. The role of this additive is to provide a layer of non-reacting material, which is intercalated between the newly created surfaces of perovskite after the impact. This layer prevents the formation of chemical links between the two surfaces created when the particles are broken thus maintaining a high specific surface area. The additive must not react with the perovskite in the sense that is should not diffuse into the perovskite lattice. Moreover, it must be soluble in water or any other solvent so that it can be washed out of the perovskite or perovskite-like end product. Preferably the additive is added in a solid form although it could also be added in an aqueous form. Suitable additives include LiCl, NaCl, RbCl, CsCl, $NH_4Cl$, ZnO, and $NaNO_3$.

EXAMPLE 1

In normal milling conditions, starting powders are weighed and mixed in the desired proportion leading to the composition of the final compound. In this specific example, 3.3 g of lanthanum oxide ($La_2O_3$) and 1.7 g of cobalt oxide ($Co_3O_4$) were introduced in a cylindrical tempered steel container having 5 mm thick wall with three tempered steel balls [two of 7/16 inches diameter (11 mm) and one of 9/16 inches diameter (14 mm)]. Preferably, the total powder weight inserted into the container is about 5 to 7 g. The container is closed with a thick cover and hermetically sealed with a VITON™ O-ring. To vary the energy of milling impacts, different sets of balls having various sizes and specific densities may be used.

The container is inserted horizontally in a laboratory SPEX™ shaker mill and the milling normally proceeds at an agitation speed of 1000 cycles per minute for a period varying from 1 to 20 hours.

Although the milling proceeds at room temperature, the numerous balls shocks within the container increase its temperature. Thus the container was fan cooled and its temperature was thus kept below 40° C. Sampling were also performed at 1, 4, 8, 16 and 20 hours of milling and the crystalline structure of the product was determined by X-ray diffractometry using a PHILIPS™ or a SIEMENS D5000™ diffractometer. In both cases, the $CuK_\alpha$ was used (lambda= 1.54 Angstrom). Spectra were recorded in a step scanning from 10 to 80° in 2θ angle with a 2.4 s for each 0.05° step. Correct identification of the compounds was performed by comparing the patterns obtained with the patterns found in a patterns' library.

The specific surface area of the product was determined by using the Brunauer, Emmet, and Teller method (BET) using a computer-controlled sorption analyzer (OMNISORB 100™) from Omicron, operating in continuous mode. Samples of about 1 g were heated under a vacuum at various temperatures (see Table 1) until complete removal of humidity (20 to 24 hours) prior to the adsorption-desorption experiments. Nitrogen adsorption measurement was performed at liquid nitrogen temperature, with a scanning pressure of up to 75 Torr.

FIGS. 1 to 4 illustrate the X-ray patterns allowing to deduct the evolution of the crystalline structure from the product found in the container at different periods during the milling.

Figure 1:
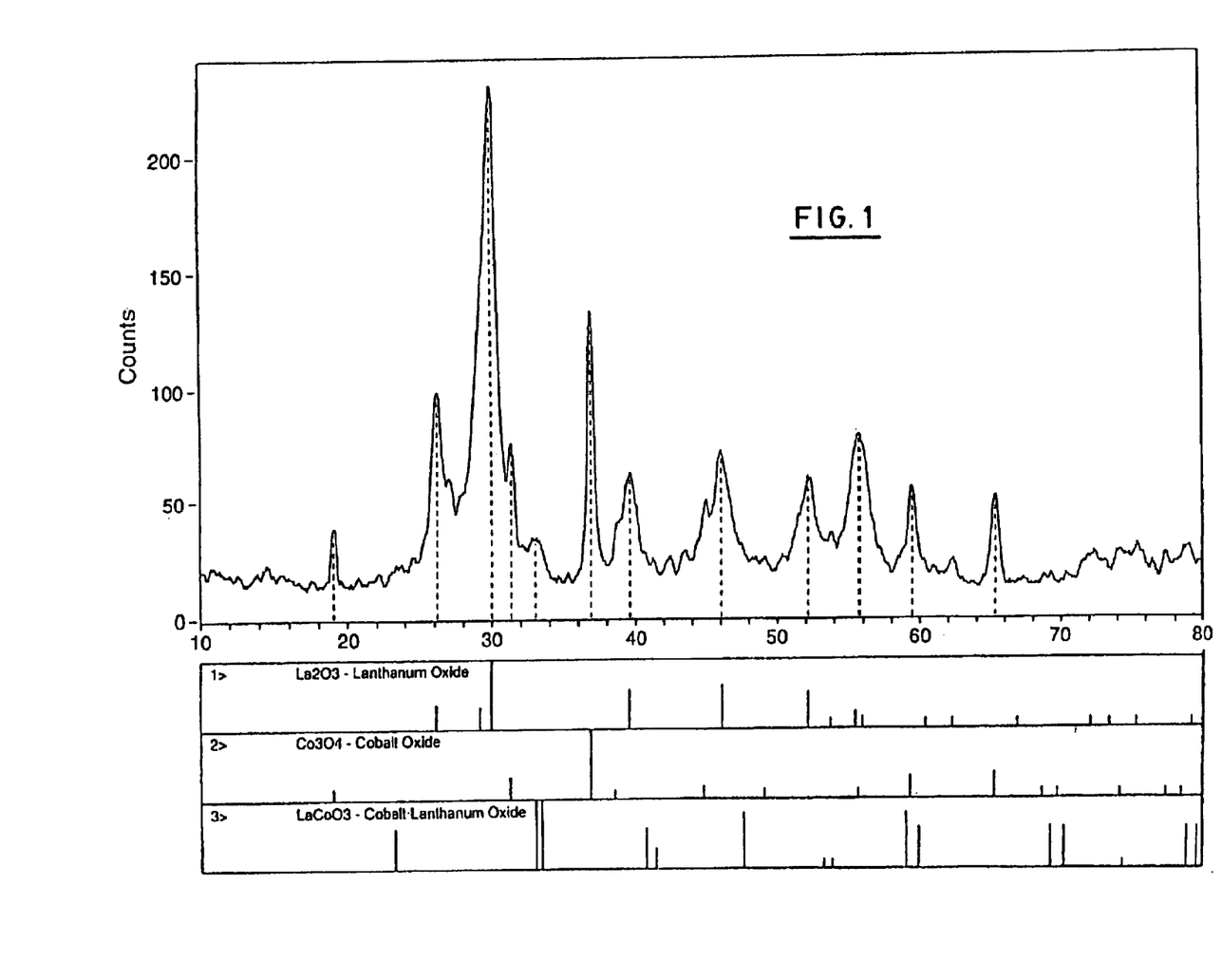
FIG. 1 is an X-ray diffraction pattern ($CuK_\alpha$ wavelength), shown on a scale of 10° to 80° diffraction angle (2θ), of a sample taken after one hour of high energy milling. Peaks corresponding to the starting powders ($La_2O_3$ and $Co_3O_4$) and the obtained perovskite ($LaCoO_3$) can be identified by using the corresponding bars at the bottom of the Figure.

As seen in FIG. 1, after one hour of milling, the typical patterns of the two starting oxides $La_2O_3$ and $Co_3O_4$ are clearly seen. Perovskite-type structure ($LaCoO_3$) begins to stand out.

Figure 2:
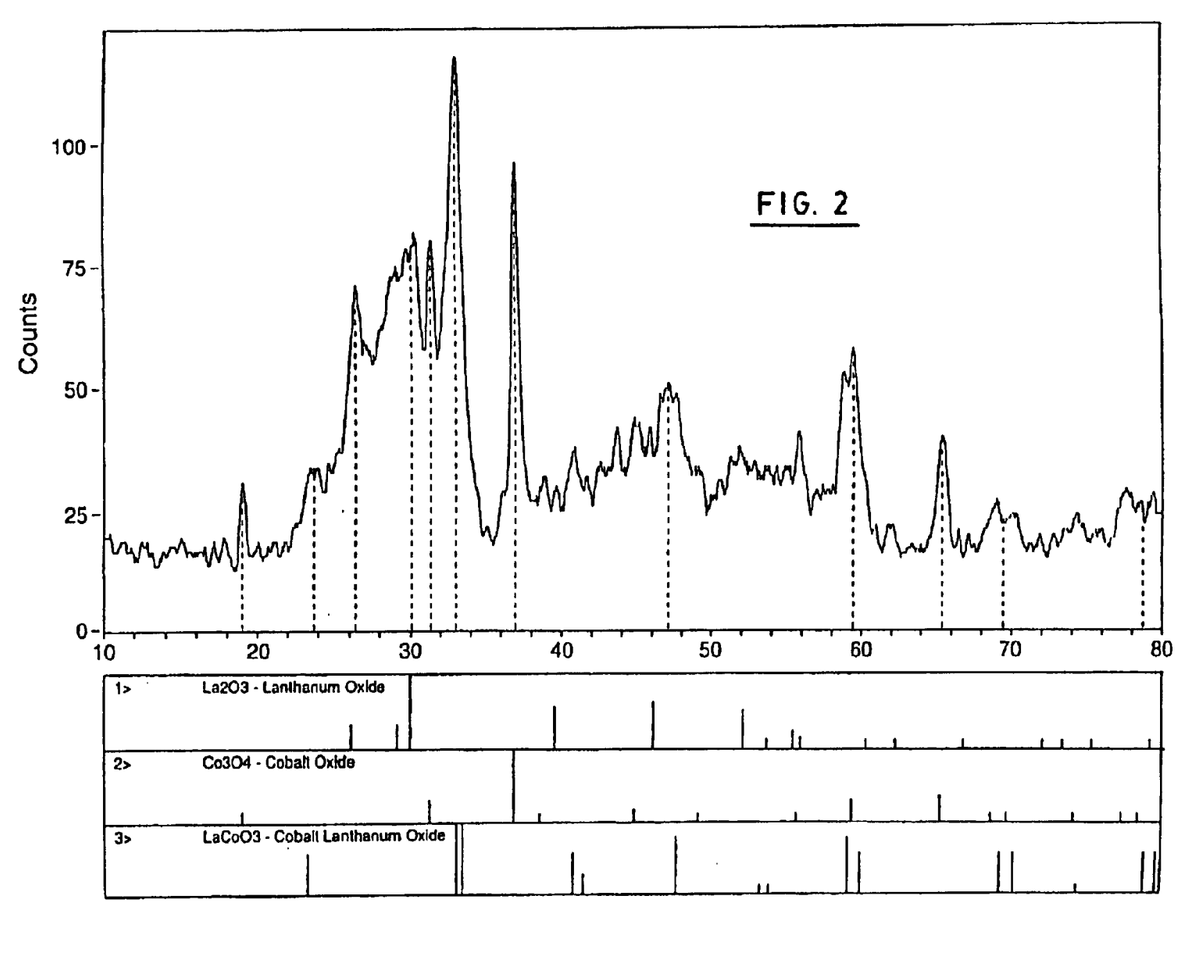
FIG. 2 is an X-ray diffraction pattern of a sample taken after four hours of high energy milling.
Figure 3:
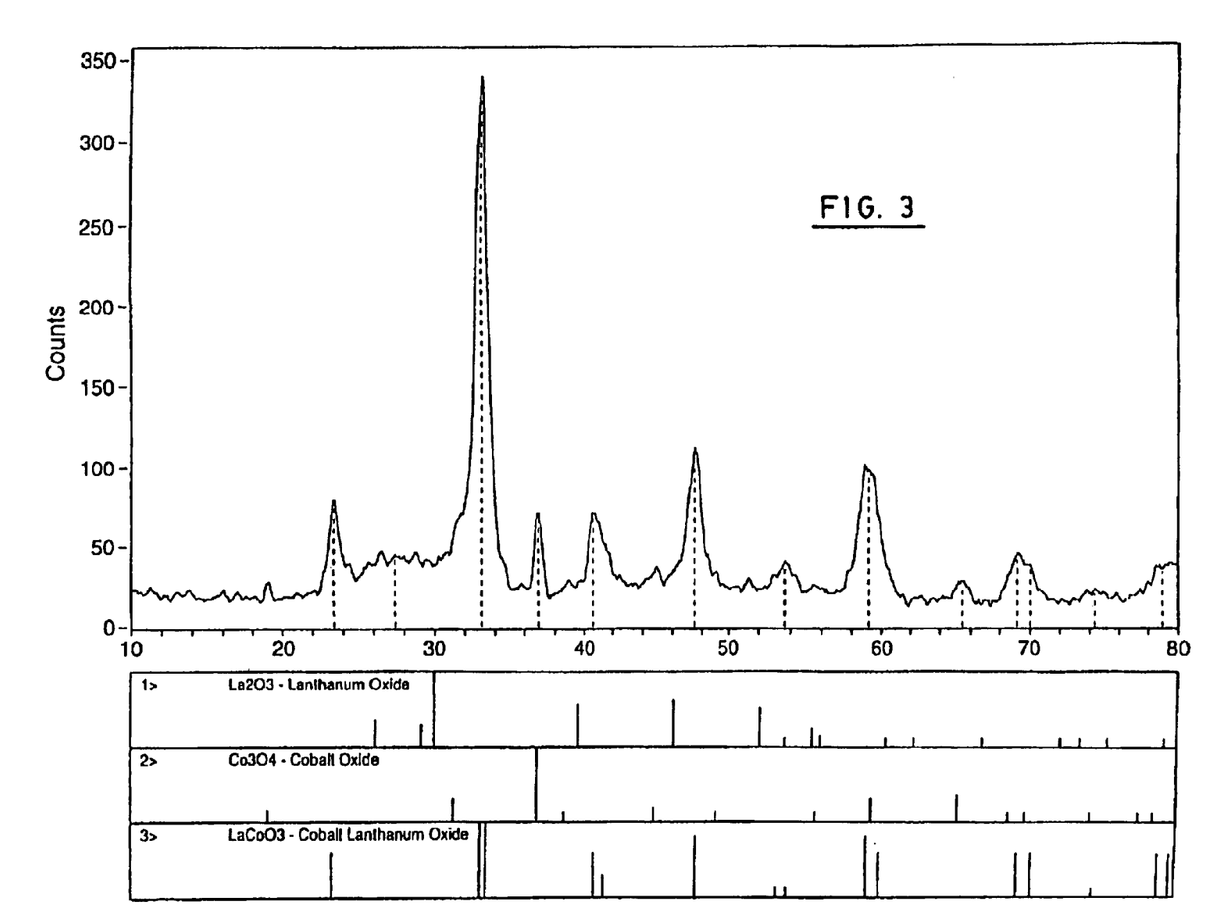
FIG. 3 is an X-ray diffraction pattern of a sample taken after eight hours of high energy milling.
Figure 4:
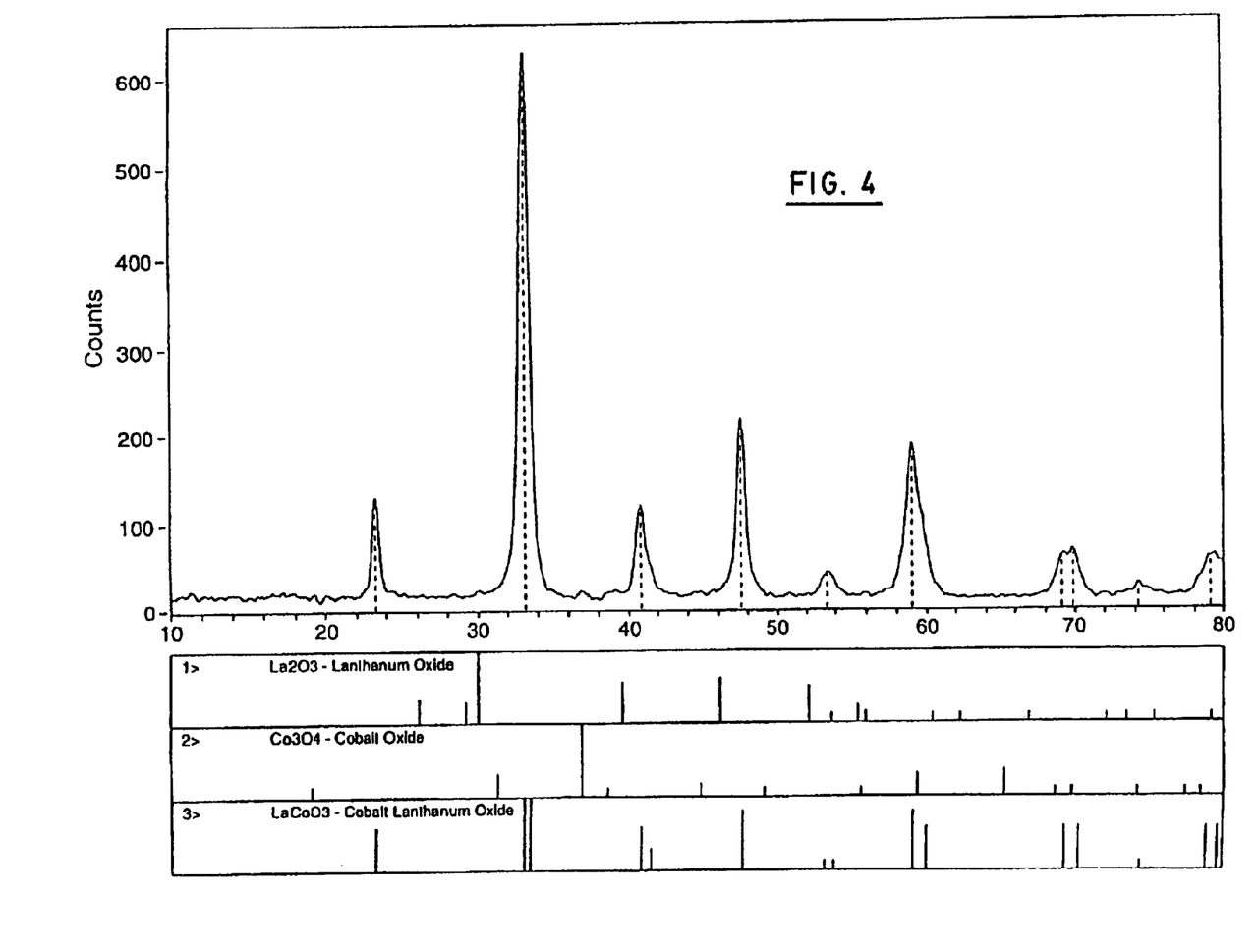
FIG. 4 is an X-ray diffraction pattern of a sample taken after sixteen hours of high energy milling. By using the bars at the bottom of the Figure it can be seen that all the major peaks correspond to the produced perovskite $LaCoO_3$.

As shown in FIGS. 2 and 3 after four and eight hours of milling, the intensities of the starting oxides peaks diminish gradually. It can also be appreciated that the peaks of the perovskite-type structure grow accordingly.

After sixteen hours of milling (FIG. 4), the content of the container is practically all converted in perovskite since the patterns of the two starting oxides have almost all disappeared. The major peaks thus show exclusively the presence of perovskite structure compound. In fact, this X-ray pattern shows that about 95% of the content of the powder within container consists of perovskite after sixteen hours of milling. Specific surface area measurements revealed that this final compound has a specific surface area of about 16 $m^2/g$, a value distinctly higher than that of conventional method which is only in the order of a few $m^2/g$.

It has also been discovered that the milling performance may be increased by replacing the normal milling atmosphere. For example, in a second variant of the process, the milling atmosphere was replaced by injecting into the container pure oxygen ($O_2$). This causes the speed of the reaction to be slightly increased. The complete conversion (as evaluated by X-ray diffraction) of the starting oxides to perovskite was obtained in 14 hours as compared to 16 hours where the atmosphere was not changed.

Likewise, it is believed that the use of other gases such as $CO_2$, $NO_2$, $NH_3$, and $H_2S$, instead of using ambient air as the reaction atmosphere, may have a positive effect on the milling reaction. More particularly, it increases the speed of the reaction and/or it increases the specific surface area of the resulting perovskite.

Since the milling is normally performed in a steel container, iron contamination in the final compound was measured. Analysis showed that following 20 hours of normal milling, this contamination is minor since it constitutes less than 1% of the final compound as detected by scanning electronic microscopy (data not shown).

In order to improve the specific surface area of the perovskite obtained in normal milling conditions, various milling conditions were tested. These include: replacing the tempered steel balls and container by tungsten one's; increasing the duration of milling; and submitting the perovskite obtained after normal milling conditions to a subsequent milling step, called a post-treatment, under a modified atmosphere.

EXAMPLE II

It is believed that during the high energy milling using a sealed container, the oxygen contained in the trapped air is rapidly consumed by the metallic atoms exposed to the surface newly created by the breaking of crystals under the repetitive impacts within the container. Thus, very rapidly, the milling is performed under an inert nitrogen atmosphere. In such conditions, the exposed surfaces "stick back" together, giving perovskite with lower specific surface area. Therefore, like for the first step, the Applicant modified the normal milling atmosphere in order to increase the specific surface area.

For example, in a third preferred embodiment, perovskite was first synthesized in a sealed container according to example 1. Then the perovskite newly synthesized was further high energy milled for a period of up to 72 hours under constant level oxygen atmosphere. Oxygen level was kept to a normal level (air) by replacing the sealed joint of the container by a filter-paper ring in order to let the normal air to seep into the container. By doing so, the BET specific surface area of the milled perovskite was increased from about 16 $m^2/g$ to about 23 $m^2/g$.

Likewise, it is believed that the use of other reactive gases such as $CO_2$, $NO_2$, $NH_3$, and $H_2S$, instead of using ambient air as the reaction atmosphere, may have a positive effect on the milling reaction (increase of the speed of the reaction and/or increase of the specific surface area of the resulting perovskite, etc.).

EXAMPLE III

In a fourth variant, the perovskite was obtained after normal milling conditions in a tungsten carbide container. However, since the density of the tungsten carbide balls is higher than the one of tempered steel balls, the speed of agitation must be reduced to avoid the destruction of the container or the balls.

In a fifth variant, the perovskite obtained in normal milling conditions was post-treated. This post-treatment comprises further high energy milling of the perovskite under an humidified atmosphere. Preferably, to obtain said humidified atmosphere, a small quantity of water (six drops) was simply added to said perovskite (~5 g), the container was sealed and the whole was submitted to a subsequent normal milling for one to six hours.

Table 1 presents the specific surface area measurements using the BET method following the milling of lanthanum oxide ($La_2O_3$) and cobalt oxide ($Co_3O_4$) in order to obtain a perovskite structure of the type $LaCoO_3$ according to the first, fourth or fifth preferred embodiment of the invention.

As can be appreciated, the milling within a tungsten carbide container (samples 1 and 2) does not improve the specific surface area of the resulting perovskite as compared to perovskite obtained within a tempered steel container (example 1, sample 3). However, further high energy milling of the perovskite under a humidified atmosphere provides a perovskite having a specific surface area of up to about 36 $m^2/g$ (sample 4), one of the highest value reached in the art. The humidified milling atmosphere created by the addition of water during the subsequent milling of the perovskite is thus one of the factors which have an important positive influence on the increase of the specific surface area of the perovskite obtained according to this process.

The catalytic activity of the post-treated perovskite (sample 4) was also evaluated and compared with the catalytic activity of sample 1. As seen in Table 2, the perovskite obtained following the post-treatment has a Minimal Temperature of Total Conversion (MTTC) lower than the untreated perovskite. It has been calculated that this 70° C. difference to the advantage of the post-treated sample, corresponds to a catalytic activity superior by a factor of about 600 to 2000 times over sample 1. Such an increase is largely superior (from about 50 to 200 times) to what should have been obtained for a perovskite having a specific surface area of 36 $m^2/g$ and the same activity per unit surface area as sample 1, since the specific surface area ratio of the post-treated perovskite (sample 4) over the untreated (sample 1) is only 11.6 (36/3.1).

These results thus show that, besides having a high specific surface area, the post-treated perovskite obtained according to this variant of the process of the invention also has a high density of lattice defects thereby having a higher catalytic activity. A high density of lattice defects is a characteristic which is highly desirable for the eventual application of the perovskite as catalyst and in electronic conductive components.

EXAMPLE IV

Table 3 presents the specific surface area measurements using the BET method following the mechanosynthesis of various perovskite products. According to the sixth preferred embodiment of the invention, a grinding additive is introduced in the container during the post-treatment of a perovskite sample. The role of this additive is to provide a thin film which is intercalated in between the two faces of a fracture in the perovskite crystal lattice as it is formed upon impact with the balls in the grinding process. This film prevents the two surfaces from recombining with each other and thus preserves a high specific surface area in the final product. The additive must not react with the perovskite and in particular it should not diffuse into the perovskite lattice. Moreover it should be soluble in water or in an other solvent which allows to leach it out of the sample after the post-treatment. As demonstrated in Table 3, in the case of the perovskite $LaCoO_3$ several additive have been shown efficient including the chlorides of Lithium (samples 6 and 7), sodium (samples 5 and 8) and ammonium (sample 18), sodium nitrate (sample 9). The highest specific surface area of 82.5 $m^2/g$ was reached using zinc oxide (sample 17). ZnO is leached out of the sample using a solution of ammonium chloride. In Table 3 different values of the BET surface area are reported for some of the samples (samples 5 and 8). Different values are obtained for the same sample treated for two hours in pure oxygen at the reported temperature. This shows that mechanosynthesized perovskites may keep rather high surface areas even after calcination at 300–500° C. The additive may be introduced in the container as a powder or as a saturated solution.

The results in Table 3 indicate that the process involving an additive at the post-treatment step also yielded high BET surface area for such solids as $CeCuO_3$ (samples 10 and 11), $YCoO_3$ (sample 14) and more complex perovskites such as $La_{0.6}Sr_{0.4}Co_{0.8}Fe_{0.2}O_3$ (sample 12), $La_{0.6}Sr_{0.4}CoO_3$ (sample 13), $La_{0.6}Sr_{0.4}MnO_3$ (sample 15) and $LaMn_{0.8}Mg_{0.2}O_3$ (sample 16).

These results demonstrate that the present invention provides a very simple process that avoids any high temperature heating for the preparation of perovskites of unprecedented high surface area. The resulting solids have therefore potential applications as very active catalysts for low temperature oxidations and as electrocatalysts for the catholic reduction of oxygen.

EXAMPLE V

Table 4 presents the mechanosynthesis of various perovskite-like products.

In these experiments the objective was not to enhance the specific surface area but to demonstrate the capacity of the technique to control the stoichiometry of the perovskite-like materials and their deviation to stoichiometric oxygen content Comparing samples 21 and 22 shows how easy it is to produce either the brownmillerite or the perovskite of same cationic composition. Starting with one mole of SrO and half a mole of $Fe_2O_3$ the brownmillerite $SrFeO_{2.5}$ is obtained (sample 21) as demonstrated by X-ray diffractometry, provided no additional oxygen is admitted during milling. In the other case, namely where oxygen gas is deliberately introduced during grinding simply by opening frequently the mill, the perovskite $SrFeO_3$ is obtained (sample 22).

Experiments 19 and 23 show that a similar control of oxygen vacancies is possible with perovskite-like materials. Sample 19 obtained with 1 mole of SrO and ¾ of a mole of $Fe_2O_3$ as the starting material and with no oxygen readmitted to the mill after it was first closed in air is a brownmillerite-like compound of type $[SrFeO_{2.5}+Fe_{0.5}O_{0.5+x^*}]$ wherein $0<x^*<10$. Sample 23 prepared from 1 mole of SrO, half a mole of $Fe_2O_3$ and ⅙ mole of $Co_3O_4$ in an oxygen rich milling atmosphere is a perovskite-like material of composition $[SrFe_{0.5}Co_{0.5}O_3+Fe_{0.5}O_{x^*}]$ wherein $0<x^*<10$. Normally, the two samples 19 and 23 have very similar overall composition namely $SrFe_{1.5}O_{3+x^*}$ (sample 19) and $SrFeCo_{0.5}O_{3+x^*}$ (sample 23) but their basic crystal structure is a brownmillerite in the first case and a perovskite in the latter case, the difference been induced by the addition of oxygen gas in the milling atmosphere.

Sample 20 was obtained from a powder prepared in the same way as sample 19 but further submitted to a sintering process in a press exerting a pressure of 2 ton/cm² for 1 hour at the temperature of 1100° C. Sample 20 was under the form of a uniform, 0.5 μm thick wafer of crack fee ceramic with brownmillerite structure. This experiment demonstrated that the perovskite and perovskite-like materials manufactured according to the present invention are especially well suited for the preparation of thin ceramic membranes of uniform composition. The basic reason is that the high energy ball milling compounds of the perovskite type insures the spatial uniformity in composition of the material at atomic level before the molding process of the ceramic. This is a very important asset of the present invention, the products of which will yield high quality ceramics to be produced on a commercial scale.

According to another aspect of the invention, the metal oxides obtained according to the process of the present invention may be doped with a transition group metal or a precious group metal. In the industry, the doping of a metal oxide used as catalyst enables the sulfur poisoning (SO2) to be reduced. Preferably the doping metal used for doping the metal oxides is selected from the group consisting of osmium, irridium, platinum, ruthenium, rhodium, palladium, iron, cobalt, nickel, and copper.

The doping is preferably performed only once the metal oxide has been synthesized since an early doping would reduce the specific surface area of the synthesized metal oxide. Advantageously, the doping can be performed during the post-treatment step with the help of a piece of the selected doping metal inserted in the container during the subsequent high energy milling. However, the metal oxide obtained after the milling could also be doped by treating this metal oxide with a deposit of the doping metal using methods known to the one skilled in the art.

Although preferred variants of the invention according to the present invention have been described in detail herein and illustrated in the accompanying figures and tables, it is to be understood that the invention is not limited to these precise embodiments and that various changes and modifications may be effected therein without departing from the scope or spirit of the invention.

For example, a planetary ball-milling machine could be used instead of an horizontal mill. Starting powders could also be ground before their high energy milling. Likewise perovskite obtained after the milling according to the process of the invention, could also be treated to increase its catalytic activity by removing its iron contamination.

TABLE 1

Specific surface area measurements using the BET method

| Sample | Milling conditions and duration | Heating Temperature (° C.) | Surface area (m²/g) |
|---|---|---|---|
| 1 LaCoO$_3$ | A) Normal milling: Feed*: ½ La$_2$O$_3$ + ⅓ Co$_3$O$_4$ Duration = 12 hours Atmosphere = air Container + Balls = Tungsten carbide Speed = 700 cycles/min | 400 | 3.1 |
| 2 LaCoO$_3$ | A) Normal milling: Feed*: ½ La$_2$O$_3$ + ⅓ Co$_3$O$_4$ Duration = 20 hours Atmosphere = air Container + Balls = Tungsten carbide Speed = 700 cycles/min | 200 400 | 5.6 7.6 |
| 3 LaCoO$_3$ | A) Normal milling: Feed*: ½ La$_2$O$_3$ + ⅓ Co$_3$O$_4$ Duration = 20 hours Atmosphere = air Container + Balls = Tempered steel Speed = 1000 cycles/min | 200 380 | 10.2 16.3 |
| 4 LaCoO$_3$ | A) Normal milling: Feed*: ½ La$_2$O$_3$ + ⅓ Co$_3$O$_4$ Duration = 24 hours Atmosphere = air Container + Balls = Tempered steel Speed = 1000 cycles/min B) Post-treatment Duration: = Subsequent milling for 6 hours Atmosphere = Humidified Container + Balls = Tempered steel Speed = 1000 cycles/min | 200 370 | 35.9 32.1 |

*Starting powders and their relative molar ratio

TABLE 2

Comparison of the catalytic activity* of standard perovskite with the post-treated perovskite obtained according to the method of the Invention

| Perovskite | Specific surface area (m²/g) | MTTC** |
|---|---|---|
| Untreated (sample 1) | 3.1 | 295° C. |
| Post-treated (sample 4) | 36 | 225° C. |

*Measured by the conversion of n-Hexane (Conditions: $Y_{C6N14}$ = 1%; $Y_{O2}$ = 89.1%; Catalyst weight = 0.105 ± 0.0015 g)
**MTTC = Minimal Temperature of Total Conversion at a space velocity of 22 500 h$^{-1}$.

TABLE 3

Specific surface area measurements using the BET method

| Sample | Milling conditions and duration | Heating Temperature (° C.) | Surface area (m²/g) |
|---|---|---|---|
| 5 LaCoO$_3$ | A) Normal milling: Feed*: ½ La$_2$O$_3$ + ⅓ Co$_3$O$_4$ Duration = 4 hours Atmosphere = oxygen Container + Balls = Tempered steel Speed = 1000 cycles/min B) Post-treatment: Duration = 20 hours Atmosphere = oxygen Container + Balls = Tempered steel Speed = 1000 cycles/min Additive = NaCl (4.2 mol/mol) | 200 300 500 | 50 47.7 29.0 |
| 6 LaCoO$_3$ | A) Normal milling: Feed*: ½ La$_2$O$_3$ + ⅓ Co$_3$O$_4$ Duration = 4 hours Atmosphere = oxygen Container + Balls = Tempered steel Speed = 1000 cycles/min B) Post-treatment Duration = 20 hours Atmosphere = oxygen Container + Balls = Tempered steel Speed = 1000 cycles/min Additive = LiCl (5.8 mol/mol) | 200 | 56.0 |
| 7 LaCoO$_3$ | A) Normal milling: Feed*: ½ La$_2$O$_3$ + ⅓ Co$_3$O$_4$ Duration = 4 hours Atmosphere = oxygen Container + Balls = Tempered steel Speed = 1000 cycles/min B) Post-treatment Duration = 20 hours Atmosphere = oxygen Container + Balls = Tempered steel Speed = 1000 cycles/min Additive = LiCl (4.2 mol/mol) | 200 | 43.7 |
| 8 LaCoO$_3$ | A) Normal milling: Feed*: ½ La$_2$O$_3$ + ⅓ Co$_3$O$_4$ Duration = 4 hours Atmosphere = oxygen Container + Balls = Tempered steel Speed = 1000 cycles/min B) Post-treatment: Duration = 20 hours Atmosphere = oxygen Container + Balls = Tempered steel Speed = 1000 cycles/min Additive = NaCl (4.2 mol/mol) | 200 300 | 48.9 40.5 |
| 9 LaCoO$_3$ | A) Normal milling: Feed*: ½ La$_2$O$_3$ + ⅓ Co$_3$O$_4$ Duration = 4 hours Atmosphere = oxygen Container + Balls = Tempered steel Speed = 1000 cycles/min B) Post-treatment Duration = 20 hours Atmosphere = oxygen Container + Balls = Tempered steel Speed = 1000 cycles/min Additive = NaNO3 (1:1 w/w) | 200 | 50.8 |
| 10 CeCuO$_3$ | A) Normal milling: Feed*: CeO$_2$ + CuO Duration = 4 hours Atmosphere = oxygen Container + Balls = Tempered steel Speed = 1000 cycles/min B) Post-treatment Duration = 20 hours Atmosphere = oxygen Container + Balls = Tempered steel Speed = 1000 cycles/min Additive = NaCl (1:1 w/w) | 200 | 30.26 |

TABLE 3-continued

Specific surface area measurements using the BET method

| Sample | Milling conditions and duration | Heating Temperature (° C.) | Surface area (BET) (m²/g) |
|---|---|---|---|
| 11 $CeCuO_3$ | A) Normal milling:<br>Feed*: $CeO_2$ + CuO<br>Duration = 4 hours<br>Atmosphere = oxygen<br>Container + Balls = Tempered steel<br>Speed = 1000 cycles/min<br>B) Post-treatment<br>Duration = 20 hours<br>Atmosphere = oxygen<br>Container + Balls = Tempered steel<br>Speed = 1000 cycles/min<br>Additive = NaCl (1:1 w/w) | 200 | 39.2 |
| 12 $La_{0.6}Sr_{0.4}$ $Co_{0.8}Fe_{0.2}O_3$ | A) Normal milling:<br>Feed*: $0.3La_2O_3$ + 0.4SrO + $0.27Co_3O_4$ + $0.1Fe_2O_3$<br>Duration = 5 hours<br>Atmosphere = oxygen<br>Container + Balls = Tempered steel<br>Speed = 1000 cycles/min<br>B) Post-treatment<br>Duration = 19 hours<br>Atmosphere = oxygen<br>Container + Balls = Tempered steel<br>Speed = 1000 cycles/min<br>Additive = NaCl (1:1 w/w) | 200<br>300<br>600 | 47.8<br>44.5<br>20.2 |
| 13 $La_{0.6}Sr_{0.4}$ $CoO_3$ | A) Normal milling:<br>Feed*: $0.3La_2O_3$ + $0.4Sr_2O$ + $⅓Co_3O_4$<br>Duration = 4 hours<br>Atmosphere = oxygen<br>Container + Balls = Tungsten Carbide<br>Speed = 700 cycles/min<br>B) Post-treatment<br>Duration = 20 hours<br>Atmosphere = oxygen<br>Container + Balls = Tungsten Carbide<br>Speed = 700 cycles/min<br>Additive = NaCl (1:1 w/w) | 200<br>300<br>600 | 30.2<br>25.6<br>12.7 |
| 14 $YCoO_3$ | A) Normal milling:<br>Feed*: $½Y_2O_3$ + $⅓Co_3O_4$<br>Duration = 7 hours<br>Atmosphere = oxygen<br>Container + Balls = Tempered steel<br>Speed = 1000 cycles/min<br>B) Post-treatment<br>Duration = 17 hours<br>Atmosphere = oxygen<br>Container + Balls = Tempered steel<br>Speed = 1000 cycles/min<br>Additive = NaCl (1:1 w/w) | 200<br>600 | 24.2<br>9.6 |
| 15 $La_{0.6}Sr_{0.4}$ $MnO_3$ | A) Normal milling:<br>Feed*: $0.3La_2O_3$ + 0.4SrO + $MnO_2$<br>Duration = 7 hours<br>Atmosphere = oxygen<br>Container + Balls = Tungsten Carbide<br>Speed = 700 cycles/min<br>B) Post-treatment<br>Duration = 17 hours<br>Atmosphere = oxygen<br>Container + Balls = Tungsten Carbide<br>Speed = 700 cycles/min<br>Additive = NaCl (1:1 w/w) | 200 | 45.4 |
| 16 $LaMn_{0.8}$ $Mg_{0.2}O_3$ | A) Normal milling:<br>Feed*: $0.5La_2O_3$ + $0.8MnO_2$ + 0.2MgO<br>Duration = 8 hours<br>Atmosphere = oxygen<br>Container + Balls = Tempered steel<br>Speed = 1000 cycles/min<br>B) Post-treatment:<br>Duration = 16 hours<br>Atmosphere = oxygen<br>Container + Balls = Tempered steel<br>Speed = 1000 cycles/min<br>Additive = NaCl (1:1 w/w) | 200<br><br><br><br><br><br>200 | 3.1<br><br><br><br><br><br>28.7 |
| 17 $LaCoO_3$ | A) Normal milling:<br>Feed*: $0.5La_2O_3$ + $⅓Co_3O_4$<br>Duration = 4 hours<br>Atmosphere = oxygen<br>Container + Balls = Tempered steel<br>Speed = 1000 cycles/min<br>B) Post-treatment:<br>Duration = 20 hours<br>Atmosphere = oxygen<br>Container + Balls = Tempered steel<br>Speed = 1000 cycles/min<br>Additive = ZnO (1:1 poids) | 200 | 82.5 |
| 18 $LaCoO_3$ | A) Normal milling:<br>Feed*: $½La_2O_3$ + $⅓Co_3O_4$<br>Duration = 4 hours<br>Atmosphere = oxygen<br>Container + Balls = Tempered steel<br>Speed = 1000 cycles/min<br>B) Post-treatment<br>Duration = 20 hours<br>Atmosphere = oxygen<br>Container Balls = Tempered steel<br>Speed = 1000 cycles/min<br>Additive = NH4Cl (1:1 poids) | 200 | 57.3 |

*Starting powders and their relative molar ratio

TABLE 4

Preparation of brownmillerites and other perovskite-like materials

| Sample | Milling conditions and duration |
|---|---|
| 19 $SrFe_{1.5}O_{3+x}$, Brownmillerite | A) Normal milling:<br>Feed*: = 1 SrO + ¾ $Fe_2O_3$<br>Duration = 16 hours<br>Atmosphere = air (never opened)<br>Container + Balls = Tempered steel<br>Speed = 1000 cycles/min<br>Additive = none |
| 20 $Sr_7Fe_{10}O_{22}$ Brownmillerite | A) Normal milling: Same as 19<br>B) Post-treatment: Sintering process<br>Duration = 1 hour<br>Pressure = 2 ton/cm²<br>Temperature = 1100° C. |
| 21 $SrFeO_{2.5}$ Brownmillerite | A) Normal milling:<br>Feed*: = SrO + ½ $Fe_2O_3$<br>Duration = 24 hours<br>Atmosphere = Ar<br>Container + Balls = Tempered Steel<br>Speed = 1000 cycles/min<br>Additive = none |

TABLE 4-continued

Preparation of brownmillerites and other perovskite-like materials

| Sample | Milling conditions and duration |
|---|---|
| 22<br>$SrFeO_3$<br>Perovskite | A) Normal milling:<br>Feed*: = 1 SrO + ½ $Fe_2O_3$<br>Duration = 24 hours<br>Atmosphere = oxygen (frequent openings)<br>Container + Balls = Tempered steel<br>Speed = 1000 cycles/min<br>Additive = none |
| 23<br>$SrFeCo_{0.6}O_{3+x}$,<br>Perovskite-like | A) Normal milling:<br>Feed*: = SrO + ½ $Fe_2O_3$ + ⅙ $CoO_4$<br>Duration = 16 hours<br>Atmosphere = frequent admission of oxygen<br>Container + Balls = Tempered steel<br>Speed = 1000 cycles/min<br>Additive = none |

*Starting powders and their relative molar ratio

What is claimed is:

1. A process for mechanosynthesizing a metal oxide having a perovskite or perovskite-like crystal structure, and a stoichiometric content of oxygen, and a high BET specific surface area, said metal oxide being selected from the group consisting of perovskites of the general formula $ABO_3$; perovskite-like materials of the general formula $[(ABO_3)_n + C_yO_z]$; non-stoichiometric compounds derived from perovskite and having the general formula $(ABO_{3-x})$; and non-stoichiometric compounds derived from perovskite-like materials and having the general formula $[(ABO_{3-x})_n + C_yO_z]$, wherein:

A comprises at least one element selected from the group consisting of Al, Y, Na, K, Rb, Cs, Pb, La, Sr, Ba, Cr, Ag, Ca, Pr, Nd, Bi and the elements of the lanthanide series of the periodic table;

B comprises at least one element selected from the group consisting of Al, Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo and W;

C represents at least one element selected from the group consisting of Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo, W, Al, Y, Na, K, Rb, Cs, Pb, La, Sr, Ba, Cr, Ag, Ca, Pr, Nd, Bi and the elements of the lanthanide series of the periodic table;

n represents an integer number between 1 and 10;

0<x<3 y represents an integer number between 1 and 5;

z represents an integer number between 1 and 5;

said process consisting essentially of the steps of:

a) subjecting a mixture of starting powders, which are in the form of oxides, hydroxides, carbonates, nitrates, or oxalates, and are formulated to contain the components represented by A, B and C in the formulas to a high energy milling sufficient to induce chemical reaction of the components and thereby directly mechanosynthesize said metal oxide in the form of a perovskite or a perovskite-like material having a nanocrystalline structure as determined by X-ray diffractometry;

b) increasing the BET specific surface area of the metal oxide obtained in step a) by further subjecting said metal oxide to high energy milling under a humidified atmosphere to obtain a metal oxide having a high BET specific surface area.

2. The process of claim 1, wherein the high energy milling of step a) is performed under a controlled atmosphere to control the nanocrystalline structure and the stoichiometric oxygen content of the mechanosynthesized metal oxide.

3. The process of claim 2, wherein the atmosphere of step a) comprises a gas selected from the group consisting of He, Ar, $N_2$, $O_2$, $H_2$, CO, $CO_2$, $NO_2$, $NH_3$, $H_2S$ and mixtures thereof.

4. The process of claim 1, further comprising the step of adding a small amount of an aqueous solution to the metal oxide during the milling of step b) in order to obtain a humidified metal oxide.

5. The process of claim 1, wherein the high energy milling of step b) is performed under a controlled atmosphere to control the BET specific surface area of the mechanosynthesized metal oxide.

6. The process of claim 5, wherein the atmosphere of step b) comprises a gas selected from the group consisting of $H_2O$, He, Ar, $N_2$, $O_2$, H2, CO, $CO_2$, $NO_2$, $NH_3$, $H_2S$ and mixtures thereof.

7. The process of claim 1, further comprising the step of selecting and milling the starting powders in relative portions to control the final nanocrystalline structure of the mechanosynthesized metal oxide.

8. The process of claim 1, further comprising the steps of:

c) adding a non-reacting soluble additive during the milling of step b); and d) subsequently washing out said soluble additive.

9. The process of claim 8, wherein the non-reacting soluble additive is selected from the group consisting of LiCl, NaCl, RbCl, $C_3Cl$, $NH_4Cl$, ZnO, and mixtures thereof.

10. A process for mechanosynthesizing a metal oxide having a perovskite or perovskite-like crystal structure, and a stoichiometric content of oxygen, and a high BET specific surface area, said metal oxide being selected from the group consisting of perovskites of the general formula $ABO_3$; perovskite-like materials of the general formula $[(ABO_3)_n + C_yO_z]$; non-stoichiometric compounds derived from perovskite and having the general formula $(ABO_{3-x})$; and non-stoichiometric compounds derived from perovskite-like materials and having the general formula $[(ABO_{3-x})_n + C_yO_z]$, wherein:

A comprises at least one element selected from the group consisting of Al, Y, Na, K, Rb, Cs, Pb, La, Sr, Ba, Cr, Ag, Ca, Pr, Nd, Bi and the elements of the lanthanide series of the periodic table;

B comprises at least one element selected from the group consisting of Al, Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo and W;

C represents at least one element selected from the group consisting of Ga, In, Zr, Nb, Sn, Ru, Rh, Pd, Re, Os, Ir, Pt, U, Co, Fe, Ni, Mn, Cr, Ti, Cu, Mg, V, Nb, Ta, Mo, W, Al, Y, Na, K, Rb, Cs, Pb, La, Sr, Ba, Cr, Ag, Ca, Pr, Nd, Bi and the elements of the lanthanide series of the periodic table;

n represents an integer number between 1 and 10;

0<x<3 y represents an integer number between 1 and 5;

z represents an integer number between 1 and 5;

said process comprising:

a) the single step of subjecting a mixture of starting powders, which are in the form of oxides, hydroxides, carbonates, nitrates, or oxalates, and are formulated to contain the components represented by A, B and C in the formulas to a high energy milling sufficient to induce chemical reaction of the components and thereby directly mechanosynthesize said metal oxide in the form of a perovskite or a perovskite-like material having a nanocrystalline structure as determined by X-ray diffractometry: and b) increasing the BET specific surface area of the metal oxide obtained in step a) by further subjecting said metal oxide to high energy milling under a humidified atmosphere to obtain a metal oxide having a high BET specific surface area.

* * * * *

UNITED STATES PATENT AND TRADEMARK OFFICE
CERTIFICATE OF CORRECTION

PATENT NO. : 6,770,256 B1
DATED : August 3, 2004
INVENTOR(S) : Serge Kaliaguine et al.

It is certified that error appears in the above-identified patent and that said Letters Patent is hereby corrected as shown below:

<u>Title page,</u>
Item [*] Notice, please add:
-- This patent is subject to terminal disclaimer --.

Signed and Sealed this

First Day of February, 2005

JON W. DUDAS
*Director of the United States Patent and Trademark Office*